June 27, 1961 R. E. WRIGHT 2,990,510
ELECTRIC CIRCUITS INCORPORATING MAGNETIC AMPLIFIERS
Filed Jan. 24, 1956
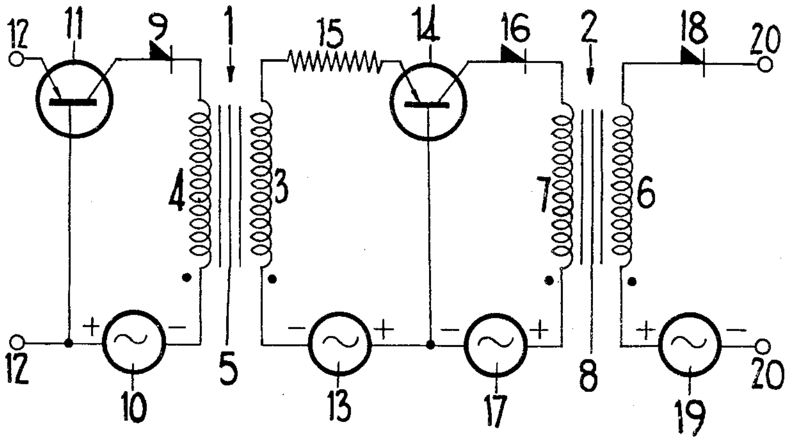
INVENTOR
RONALD EDWARD WRIGHT
BY
ATTORNEY United States Patent Office 2,990,510

Patented June 27, 1961

2,990,510
ELECTRIC CIRCUITS INCORPORATING MAGNETIC AMPLIFIERS

Ronald Edward Wright, Bushey, England, assignor to The General Electric Company Limited, London, England Filed Jan. 24, 1956, Ser. No. 561,118
Claims priority, application Great Britain Jan. 25, 1955
1 Claim. (Cl. 323—89)

This invention relates to electric circuits incorporating magnetic amplifiers.

The invention is concerned in particular with electric circuits incorporating magnetic amplifiers having of the kind including at least one saturable reactor having an output winding through which, in operation, output current can flow to a load effectively only during discrete periods (hereinafter referred to as conducting periods) corresponding respectively to alternate half-cycles of an alternating voltage provided by a source connected in circuit with said winding and the load, the operating conditions of the core of the saturable reactor during the conducting periods being dependent upon the characteristics of a control signal applied to the saturable reactor, the control signal being operative in respect of each conducting period only during the preceding interval between conducting periods (hereinafter referred to as a resetting period). Such a magnetic amplifier will be referred to in this specification as a high speed magnetic amplifier.

In certain circumstances where a high gain is required, it may be necessary to operate two high speed magnetic amplifiers in cascade, and in such cases the problem arises of providing a satisfactory coupling between the two magnetic amplifiers.

It is an object of the present invention to provide an electric circuit incorporating a pair of high speed magnetic amplifiers and utilising a simple and effective means for coupling the two magnetic amplifiers.

According to the invention, in an electric circuit incorporating a pair of high speed magnetic amplifiers the output current of one magnetic amplifier is arranged to flow through the emitter-base circuit of a transistor whose collector is connected in the input circuit of the second magnetic amplifier so that the collector current flowing in the transistor controls the operation of the second magnetic amplifier.

One arrangement in accordance with the invention will now be described by way of example with reference to the accompanying drawing, which is a circuit diagram of an electric circuit incorporating a pair of high speed magnetic amplifiers.

Referring to the drawing, the circuit includes a pair of similar saturable reactors 1 and 2, the saturable reactor 1 comprising an output winding 3 and a signal winding 4 wound on a ferromagnetic core 5, and the saturable reactor 2 comprising an output winding 6 and a signal winding 7 wound on a ferromagnetic core 8; the cores 5 and 8 are of similar construction, and the windings 3, 4, 6 and 7 all have the same number of turns. The signal winding 4 of the saturable reactor 1 is connected in series with a rectifier 9 and an alternating voltage source 10 between the collector and base of a P-N-P junction transistor 11, between whose emitter and base a signal which is to be amplified is arranged to be applied via input terminals 12; the rectifier 9 is connected in such a sense as to permit current to flow through the signal winding 4 effectively only when the collector of the transistor 11 is negative with respect to its base. One end of the output winding 3 of the saturable reactor 1 is connected to one terminal of a second alternating voltage source 13 whose other terminal is connected to the base of a second P-N-P junction transistor 14, and the other end of the winding 3 is connected via a resistor 15 to the emitter of the transistor 14. The signal winding 7 of the saturable reactor 2 is connected in series with a second rectifier 16 and a third alternating voltage source 17 between the collector and base of the transistor 14, the rectifier 16 being connected in such a sense as to permit current to flow through the signal winding 7 effectively only when the collector of the transistor 14 is negative with respect to its base. The output winding 6 of the saturable reactor 2 is connected in series with a third rectifier 18 and a fourth alternating voltage source 19 across the output terminals 20 of the circuit, between which in operation the load (not shown) is connected.

The alternating voltages produced by the four sources 10, 13, 17 and 19 are all of the same amplitude, frequency and phase, the amplitude and frequency being chosen to correspond to those of an alternating voltage which, if applied directly to one of the windings of either of the saturable reactors 1 and 2, would just sweep the core of that saturable reactor between saturation in opposite directions during one cycle. The four sources 10, 13, 17 and 19 may conveniently be constituted by separate secondary windings of a transformer (not shown) having a single primary winding to which a suitable alternating voltage is applied, and are connected in the circuit with such polarities that during one set of alternate half-cycles of the alternating voltage (which will be referred to as positive half-cycles) the rectifiers 9 and 18 are biassed in the low resistance direction, the rectifier 16 is biassed in the high resistance direction, and the emitter of the transistor 14 is biassed negatively with respect to its base. The polarities of the sources 10, 13, 17 and 19 during the positive half-cycles are indicated in the drawing. As indicated in the drawing, the windings 3 and 4 of the saturable reactor 1 are connected in the circuit in the same sense with regard to magnetisation of the core 5, taking into account the polarities of the alternating voltage sources 10 and 13, and similarly for the windings 6 and 7 of the saturable reactor 2.

The operation of the circuit will now be described, assuming initially that a constant input voltage is applied between the emitter and base of the transistor 11 in such a sense as to make the emitter positive with respect to the base. During each positive half-cycle of the alternating voltage, the collector current of the transistor 11 will flow through the signal winding 4, the magnitude of this current being substantially constant throughout the half-cycle and being dependent upon the value of the emitter current which in turn will depend upon the magnitude of the input voltage. The core 5 will thus be set in a particular unsaturated magnetic condition dependent upon the value of the input voltage; the magnetic condition of the core 5 is substantially unaffected by the output winding 3 during the positive half-cycles, since at these times substantially no current can flow in the winding 3 due to the emitter-base circuit of the transistor 14 acting as a rectifier biassed in the high resistance direction. During each negative half-cycle of the alternating voltage, substantially no current will flow in the signal winding 4 due to the rectifier 9 being biassed in the high resistance direction, but current can flow in the output winding 3 since the emitter of the transistor 14 will now be biassed positively with respect to its base. The current initially flowing in the output winding during each negative half-cycle will be small, since at this time the core 5 is unsaturated and hence the impedance of the output winding 3 will be large. At some point during the negative half-cycle the core 5 will become saturated, so that the impedance of the output winding 3 will become negligible, and a large current will flow which is limited only by the impedance of the rest of the circuit in which the output winding 3 is connected; the resistor 15 which is connected in series with the emitter of the transistor 14 is provided in order to limit this current, since during the negative half-cycles of the alternating voltage the resistance of the emitter-base circuit of the transistor 14 is low. The particular point during the negative half-cycle of the alternating voltage at which the core 5 becomes saturated will depend upon the initial magnetic condition of the core 5 at the beginning of the half-cycle, and thus upon the value of the input voltage.

During the initial part of each negative half-cycle, the emitter current in the transistor 14 will be very small, so that the impedance of the collector-base circuit of the transistor 14 will be high, and thus very little current will flow through the signal winding 7. When the core 5 becomes saturated, an appreciable emitter current will flow in the transistor 14, and a corresponding collector current will flow, the major part of the alternating voltage in the collector circuit of the transistor 14 then being developed across the signal winding 7. The core 8 will thereby be set in a particular unsaturated magnetic condition dependent upon the duration and magnitude of the pulse of emitter current flowing in the transistor 14 during the negative half-cycle, and therefore upon the value of the input voltage; the magnetic condition of the core 8 is substantially unaffected by the output winding 6 during the negative half-cycles, since at these times, substantially no current can flow in the winding 6 due to the rectifier 18 being biassed in the high resistance direction. During each positive half-cycle of the alternating voltage, substantially no current will flow in the signal winding 7 due to the rectifier 16 being biassed in the high resistance direction, but current can flow in the output winding 6 since the rectifier 18 will now be biassed in the low resistance direction. The current initially flowing in the output winding 6 during each positive half-cycle will be small, since at this time the core 8 is unsaturated and hence the impedance of the output winding 6 will be large. At some point during the positive half-cycle the core 8 will become saturated, so that the impedance of the output winding 6 will become negligible, and a large current will flow which is limited only by the impedance of the load. The particular point during the positive half-cycle of the alternating voltage at which the core 8 becomes saturated will depend upon the initial magnetic condition of the core 8 at the beginning of the half-cycle, and thus upon the value of the input voltage.

The net result of the operation is that a pulse of current flows through the load during each positive half-cycle of the alternating voltage, the duration and magnitude of this pulse being dependent upon the value of the input voltage. It will be appreciated that the conduction periods for the saturable reactors 1 and 2 correspond respectively to the negative and positive half-cycles of the alternating voltage, while the resetting periods of the saturable reactors 1 and 2 correspond respectively to the positive and negative half-cycles of the alternating voltage; the respective conducting periods will normally extend somewhat beyond the end of the corresponding half-cycles of the alternating voltage, since at the ends of these half-cycles the core 5 or 8 of the relevant saturable reactor 1 or 2 will not be completely saturated and hence the current flowing in its output winding 3 or 6 will lag behind the alternating voltage.

If now a larger input voltage is applied to the circuit, higher emitter and collector currents will flow in the transistor 11, and the core 5 will therefore be driven further from saturation during the resetting periods. The instants during the conducting periods of the saturable reactor 1 at which the core 5 becomes saturated will therefore be retarded, so that the pulses of the emitter current flowing in the transistor 14 will be of shorter duration and also may be of smaller magnitude. The core 8 will therefore not be driven so far from saturation during its resetting periods, and hence the instants during the conducting periods for the saturable reactor 2 at which the core 8 becomes saturated will be advanced. Thus if the input voltage applied to the circuit is increased a larger average current will flow through the load, and in fact this average current will be substantially proportional to the magnitude of the input current over a fairly wide range of values of the input current. It will be appreciated that for the circuit described above the transfer characteristic, that it is to say the characteristic relating the output current to the input voltage, has a positive slope, in contrast to known forms of circuit incorporating two high speed magnetic amplifiers coupled in cascade, which possess transfer characteristics having a negative slope.

In the circuit described above, the coupling transistor 14 is effectively connected in the common base connection; it would be equally possible in accordance with the invention for the coupling transistor to be connected effectively in the common emitter connection. Furthermore, in the circuit described above the magnetic amplifiers are of the half wave type, in which output current only flows during alternate half-cycles of the alternating voltage; it would be equally possible to use a transistor for coupling two high speed magnetic amplifiers of the full wave type each comprising two saturable reactors, in which output current flows alternately through the output windings of the two saturable reactors during alternate half-cycles of the alternating voltage.

In electric circuits in accordance with the invention, the use of a transistor for coupling two high speed magnetic amplifiers carries with it the usual advantages of using such devices, for example ruggedness and the lack of any requirement to supply power to a heater; in addition the transistors possess the low input impedance which is required for the coupling element. Furthermore, since high collector currents and voltages do not occur simultaneously in the coupling transistor comparatively little power is dissipated in the transistor so that its power handling capacity may be relatively small in comparison with the total power handled by the whole circuit.

I claim:

A high speed magnetic amplifier circuit comprising; first and second saturable reactors each having
a signal winding
and an output winding wound
on a ferromagnetic core;
a transistor having
an emitter,
a base
and a collector;
an input circuit for the first saturable reactor including
a first alternating voltage source,
a control signal source,
and a first rectifying means,
all connected in series with the signal winding of the first saturable reactor;
an output circuit for the first saturable reactor including
a second alternating voltage source,
and the emitter and base of the transistor,
all connected in series with the output winding of the first saturable reactor;
an input circuit for the second saturable reactor including
a third alternating voltage source,
the collector and one of the emitter and base of the transistor,
and a second rectifying means,
all connected in series with the signal winding of the second saturable reactor,
the low resistance direction for current flow through the second rectifying means being the same as the normal direction for current flow through the collector of the transistor;
and an output circuit for the second saturable reactor including
a fourth alternating voltage source,
a third rectifying means,
and a pair of output terminals,
all connected in series with the output winding of the second saturable reactor;

the alternating voltage sources all having the same frequency and phase and being connected in the circuit with such polarities that during one set of alternate half-cycles of the voltages produced by these sources, the first and third rectifying means are biased in the low resistance direction and the emitter-base circuit of the the transistor and the second rectifying means are biased in the high resistance direction;

and the signal and output windings of each saturable reactor being connected in the circuit so that, at any instant, the alternating voltage sources connected respectively in series with the signal and output windings of a saturable reactor tend to drive through those windings currents which magnetize the core of that saturable reactor in the same direction.

References Cited in the file of this patent

UNITED STATES PATENTS

| | | |
|---|---|---|
| 2,695,381 | Darling | Nov. 23, 1954 |
| 2,824,697 | Pittman et al. | Feb. 25, 1958 |
| 2,824,698 | Van Nice et al. | Feb. 25, 1958 |
| 2,866,178 | Lo et al. | Dec. 23, 1958 |

OTHER REFERENCES

"Transistor Control of Magnetic Amplifiers" by G. F. Pittman, Jr. Radio-Electronic Engineering, February 1954, pp. 13, 14, 15 and 30.